United States Patent
Hannan (10) Patent No.: US 9,893,828 B2
(45) Date of Patent: Feb. 13, 2018

(54) SIGNAL POWER/QUALITY MEASUREMENT FROM DIGITAL RF/IF INTERFACE

(71) Applicant: CommScope Technologies LLC, Hickory, NC (US)

(72) Inventor: Ariful Hannan, Sterling, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/249,027

(22) Filed: Aug. 26, 2016

(65) Prior Publication Data

US 2017/0244507 A1    Aug. 24, 2017

Related U.S. Application Data

(60) Provisional application No. 62/298,968, filed on Feb. 23, 2016, provisional application No. 62/299,240, filed on Feb. 24, 2016.

(51) Int. Cl.
| | |
|---|---|
| *H04J 11/00* | (2006.01) |
| *H04L 27/26* | (2006.01) |
| *H04W 24/06* | (2009.01) |
| *H04W 72/04* | (2009.01) |

(52) U.S. Cl.
CPC ...... *H04J 11/0023* (2013.01); *H04L 27/2628* (2013.01); *H04W 24/06* (2013.01); *H04W 72/042* (2013.01); *H04W 72/0413* (2013.01)

(58) Field of Classification Search
CPC ... H04B 17/19; H04B 1/0003; H04L 41/0816; H04W 24/00
See application file for complete search history.

(56) References Cited

U.S. PATENT DOCUMENTS

| | | | |
|---|---|---|---|
| 9,014,052 B2 | 4/2015 | Gravely et al. | |
| 2015/0244430 A1* | 8/2015 | Shattil | H04B 1/0003 370/254 |
| 2017/0064642 A1* | 3/2017 | Tarlazzi | H04B 17/19 |
| 2017/0208479 A1* | 7/2017 | Takeda | H04W 16/28 |
| 2017/0245162 A1 | 8/2017 | Beck et al. | |
| 2017/0257833 A1 | 9/2017 | Hannan et al. | |

OTHER PUBLICATIONS

CommScope, Inc., "Optical PIM Tester", Nov. 10, 2015, pp. 1-2.
(Continued)

*Primary Examiner* — David S Huang
(74) *Attorney, Agent, or Firm* — Fogg & Powers LLC (57) ABSTRACT

A signal power tester in provided. The signal power tester includes at least one interface to communicatively couple the signal power tester unit to a front-haul communication link used for communicating front-haul data to a remote radio head (RRH) having one or more antenna ports. The signal power tester further comprises a programmable processor, coupled to the interface, configured to execute software, wherein the software is operable to cause the signal power tester to do the following: determine a representative segment indicative of a noise floor of a communication signal; determine whether the representative segment meets selected criterion; determine a translation factor for the representative segment; and measure power of the communication signal based on applying the translation factor.

31 Claims, 2 Drawing Sheets

(56) References Cited

OTHER PUBLICATIONS

CommScope, Inc., "Optical PIM Tester", 2015, pp. 1-4, Publisher CommScope, Inc.
CommScope, Inc., "User Manual for Optical PIM Tester", Dec. 2015, pp. 1-49, Publisher: CommScope, Inc.
Srinivasan et al., "Discovering Physical Cell Identification in a Sub-Banded Signal in a Distributed Base Station", "U.S. Appl. No. 15/673,799, filed Aug. 10, 2017", Aug. 10, 2017, pp. 1-29.
Hannan et al., "Interference Detection and Identification in Wireless Network From RF or Digitized Signal", "U.S. Appl. No. 15/691,615, filed Aug. 30, 2017", Aug. 30, 2017, pp. 1-42.

* cited by examiner

SIGNAL POWER/QUALITY MEASUREMENT FROM DIGITAL RF/IF INTERFACE

BACKGROUND

The traditional monolithic RF base transceiver station (BTS) architecture is increasingly being replaced by a distributed BTS architecture in which the functions of the BTS are separated into two physically separate units—a baseband unit (BBU) and a remote radio head (RRH). The BBU performs baseband processing for the particular air interface that is being used to wirelessly communicate over the RF channel. The RRH performs radio frequency processing to convert baseband data output from the BBU to radio frequency signals for radiating from one or more antennas coupled to the RRH and to produce baseband data for the BBU from radio frequency signals that are received at the RRH via one or more antennas.

The RRH is typically installed near the BTS antennas, often at the top of a tower, and the BBU is typically installed in a more accessible location, often at the bottom of the tower. The BBU and the RRH are typically connected through one or more fiber optic links. The interface between the BBU and the RRH is defined by front-haul communication link standards such as the Common Public Radio Interface (CPRI) family of specifications, the Open Base Station Architecture Initiative (OBSAI) family of specifications, and the Open Radio Interface (ORI) family of specifications.

Wireless operators are under constant pressure to increase the speed, capacity and quality of their networks while continuing to hold the line on cost. As technologies evolve, the challenge is becoming increasingly difficult. One specific reason: the escalating occurrence and cost of passive intermodulation (PIM).

Already recognized as a significant drain on network performance and profitability, the problem of PIM is intensifying. Advanced wireless equipment is becoming more sensitive, and new technologies like LTE are increasingly noise limited. It has been noted that a 1 Decibel drop in uplink sensitivity due to PIM can reduce coverage by as much as 11 percent.

Testing for PIM using conventional coaxial RF testing equipment is slow, costly and dangerous. Each sector, frequency and technology must be individually connected and tested. So, most operators resort to PIM testing only after detecting a significant rise in the noise floor or a drop in connection quality. Therefore, improvements in PIM testing are needed so that operators can afford to make PIM testing a regular part of their network acceptance and preventative maintenance programs thereby increasing the profitability of their network in an increasingly competitive marketplace.

Measuring signal power from CPRI or any other digital interface which carries digitized RF/IF signal could be useful in quantifying the presence of interference power or the desired signal quality. To measure the signal power or quality, the important first step is to establish a reference. In radio receivers, the signal power is calculated from known reference of the full scale A/D voltage and the RF front-end gain. However, in the case of Optical PIM tester which interfaces to CPRI, the front end gain of RRH and the full scale A/D voltage are not known.

SUMMARY

The embodiments of the present disclosure provide systems and methods for measuring signal power or signal quality from a digital interface and will be understood by reading and studying the following specification.

In one embodiment, a signal power tester unit includes at least one interface to communicatively couple the signal power tester unit to a front-haul communication link used for communicating front-haul data to a remote radio head (RRH) having one or more antenna ports. The signal power test unit further includes a programmable processor, coupled to the interface, configured to execute software. The software is operable to cause the signal power tester unit to do the following: determine a representative segment indicative of a noise floor of a communication signal; determine whether the representative segment meets selected criterion; determine a translation factor for the representative segment; and measure power of the communication signal based on applying the translation factor.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below enable measuring signal power or signal quality from a digital interface. In particular, the embodiments estimate a spectrum of a communication signal, determine a translation factor for the noise floor (thermal noise) of a communication signal, and measure the signal power of the communication signal based on applying the translation factor to the estimated spectrum.

Distributed Base Station System

Figure 1:
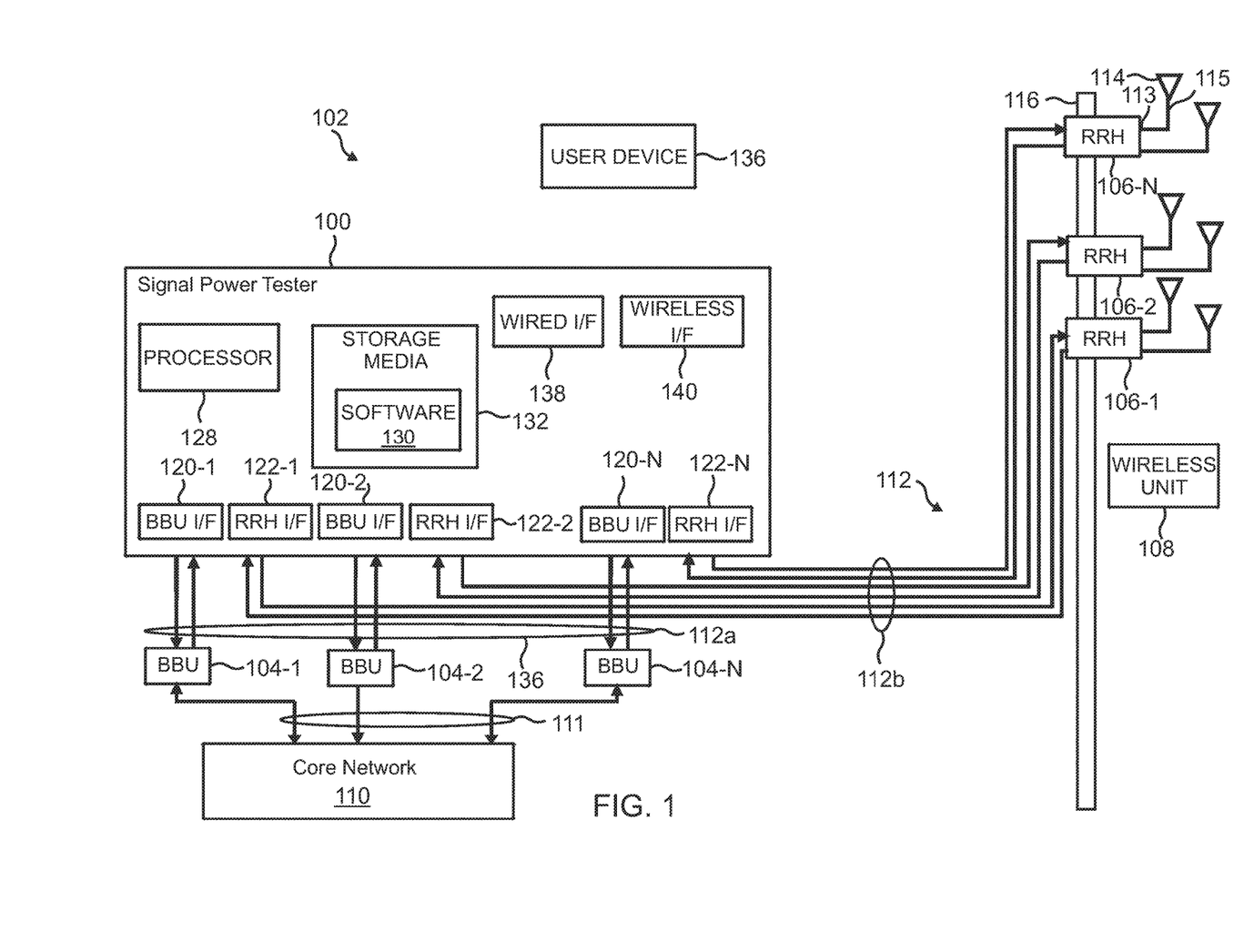
FIG. 1 is a block diagram of one exemplary embodiment of a signal power tester for a distributed base station system within which the techniques for determining the signal power described herein can be used.

FIG. 1 is a block diagram of one exemplary embodiment of a signal power tester 100 for a distributed base station system, indicated generally at 102, within which the techniques for measuring signal power or quality described herein can be used. While the embodiments are described herein with respect to an optical signal power tester, it should be understood that the systems and methods described herein apply to measuring the signal power or signal quality for any digital interface outputting an RF/IF signal.

In the exemplary embodiment shown in FIG. 1, the system 102 comprises a plurality of baseband units (BBU) 104-1 to 104-N and a plurality of remote radio heads (RRH) 106-1 to 106-N that communicate over a plurality of wireless radio frequency (RF) channels with one or more wireless units 108 (such as mobile telephones, smartphones, tablets, wireless modems for laptops or other computers or for other devices such as wireless sensors or other "Internet of Things" (JOT) or machine-to-machine (M2M) devices) using one or more standard wireless air interfaces. The exemplary embodiment of system 102 shown in FIG. 1 may support several air interfaces, e.g., three air interfaces including, but not limited to, Long-Term Evolution (LTE) 4G air interface described in the "Third Generation Partnership Project (3GPP) Technical Specification (TS) 36.211 Evolved Universal Terrestrial Radio Access (E-UTRA); Physical Channels and Modulation" specification produced by the 3GPP, Advanced Wireless Services (AWS-1), Personal Communications Services (PCS), CLR, GSM, WiMax, and others. It is to be understood that other air interfaces can be used.

Each BBU 104 is communicatively coupled to the core network 110 of a wireless service provider using a suitable bi-directional backhaul communication link 111 and interface (for example, using a wireless or wired ETHERNET connection and using the LTE S1 interface). The backhaul communication link 111 can also be used for base station-to-base station communications using the LTE X2 interface.

Each BBU 104 is communicatively coupled to a corresponding RRH 106 using a bi-directional front-haul communication link 112. In the exemplary embodiment shown in FIG. 1, the bi-directional front-haul communication link 112 is implemented using a plurality of pairs of optical fibers, where, in each pair, one optical fiber is used for downlink communications from the BBU 104 to the RRH 106 and the other optical fiber is used for uplink communications from the RRH 106 to the BBU 104. Further, as shown in FIG. 1, the plurality of optical fibers 112 are split into two parts; a first part 112a connecting BBU 104 to optical signal power tester 100 and a second part 112b connecting optical signal power tester 100 to a respective RRH 106. It is to be understood that the front-haul communication link 112 can be implemented in other ways. The exemplary embodiment shown in FIG. 1 is described here as using a CPRI interface for communications between each BBU 104 and the corresponding RRH 106 over the front-haul communication link 112. It is to be understood, however, that a different front-haul interface could be used (for example, the OBSAI or ORI interface).

As noted above, each BBU 104 performs baseband processing for the particular air interface that is being used to wirelessly communicate over its assigned RF channel, and the RRH 106 performs radio frequency processing to convert baseband data output from the BBU 104 to radio frequency signals for radiating from one or more antennas 114 that are connected to the RRH 106 at antenna port 113 via coaxial cable 115 and to produce baseband data for the associated BBU 104 from radio frequency signals that are received at the RRH 106 via one or more antennas 114.

During normal operation of the system 102, in the downlink direction, the BBUs 104 generate downlink baseband IQ data to encode frames of downlink user and control information received from the core network for communication to the wireless units 108 over the appropriate wireless RF channels. The downlink baseband IQ data is communicated from the BBUs 104 to the RRHs 106 over the respective front-haul communication link 112. The RRHs 106 receive the downlink baseband IQ data and generate one or more downlink analog radio frequency signals that are radiated from the one or more antennas 114 for reception by the wireless units 108. The wireless units 108 perform baseband processing, in accordance with the air interface, on the received downlink analog RF downlink signals in order to recover the frames of downlink user and control information.

During normal operation of the system 102, in the uplink direction, the wireless units 108 generate, in accordance with the air interface, uplink analog radio frequency signals that encode uplink user and control information that is to be communicated to the core network 110 and transmits the generated uplink analog RF signals over the wireless RF channel. The uplink analog RF signals are received by one or more antennas 114 connected to the RRHs 106. The RRH 106 that receives the uplink analog RF signal produces uplink baseband IQ data from the received uplink analog RF signals. The uplink baseband IQ data is communicated from the RRH 106 to the associated BBU 104 over the front-haul communication link 112. The BBU 104 receives the uplink baseband IQ data and performs baseband processing, in accordance with the air interface, on the uplink baseband IQ data in order to recover the uplink user and control information transmitted from the wireless units 108. The BBU 104 communicates the recovered uplink user and control information to the core network 110 over the backhaul communication link 111 using the backhaul interface.

The RRHs 106 are typically installed remotely from its corresponding BBU 104, near the antennas 114 and is mounted to a structure 116 (such as a tower, pole, building, tree, or other structure). For example, the RRH 104 can be mounted near the top of the structure 116 and the BBU 104 can be located on the ground, where the optical fibers used to implement the front-haul communication link 112 run up the structure 116 to couple the BBU 104 to the RRH 106. Although FIG. 1 shows the RRH 106 mounted near the top of structure 116, the RRH 106 can be mounted at other positions relative to the structure 116, for example, approximately midway between the bottom and top of the structure 116.

Signal Power Tester

Signal power tester 100 can be coupled to the front-haul communication link 112 in order to capture downlink and uplink frames of data communicated between the plurality of BBUs 104 and the respective plurality of RRHs 106 while the plurality of BBUs 104 and the plurality of RRHs 106 are operating normally. Also, the signal power tester 100 can inject a test signal, e.g., baseband IQ data (e.g. carrier wave (CW) tones or a modulated signal), into the frames of data communicated over the front-haul communication link 112.

In the exemplary embodiments, the signal power tester 100 calculates and injects tones into the downlink baseband IQ data on front-haul communication link 112 to detect PIM products in any uplink channels of system 102. It is to be understood, however, that the signal power tester 100 can be implemented in test equipment that provides other functionality as well. For example, the signal power tester 100 can be implemented in test equipment that includes other functions such as an optical spectrum analyzer, interference detector, and/or signal quality management system. Moreover, one or more of these functions (for example, PIM testing, spectrum analyzer, interference detecting, and signal quality management) can be combined into a single unit. For example, the optical signal power tester 100 described below can also include one or more of spectrum analyzer, interference detection, and/or signal quality management functions, in addition to PIM testing functions.

In exemplary embodiments, the signal power tester 100 and methods described herein may be used to detect the power of a Passive Intermodulation (PIM) signal during PIM testing. PIM occurs when two or more high power RF signals encounter PIM sources or materials in an RF path. These PIM sources behave like a mixer causing new signals to be generated at mathematical combinations of the original RF inputs. When these PIM signals fall in the receive frequency band of the system 102, the resulting interference causes increased dropped calls, reduced data transmission rates, and/or decreased system capacity.

PIM testing involves outputting two or more high power test RF signals on each antenna port 113 associated with a selected RF channel. If the test signals encounter a non-linear junction (for example, at the antenna port 113, in the coaxial cable 115, at the connectors connecting the coaxial cable 115 to the antenna 114 or the antenna port 113, or in the antenna 114) or other PIM source, mixing occurs causing the PIM frequencies (also referred to as PIM products) to be generated. The PIM products travel in all directions from the point of generation. This means they travel in both the downlink and uplink direction. The PIM signals travelling in the uplink direction can be received and analyzed by the optical signal power tester 100.

However, connecting PIM test equipment directly to the antenna ports 113 of the RRH 106 is typically inconvenient, especially when the RRH 106 is mounted near the top of a tower or other structure 116. To avoid having to do this, the optical signal power tester 100 is conveniently coupled to the front-haul communication link 112 near the BBUs 104. This is typically at the base of structure 116 and is thus easily accessible to a technician for running the PIM tests.

In the exemplary embodiment shown in FIG. 1, the optical signal power tester 100 is coupled to the front-haul communication link 112 by connecting the optical signal power tester 100 in-line with the plurality of BBUs 104 and the plurality of RRHs 106. The optical signal power tester 100, in this exemplary embodiment, includes two bi-directional optical interfaces 120, 122 for each RF band supported by the system 102. For each BBU 104, a BBU optical interface 120 provides a connection between optical signal power tester 100 and the associated BBU 104. Additionally, a RRH optical interface 122 provides a connection between the optical signal power tester 100 and the associated RRH 106. Each optical interface 120 and 122 comprises a pair of optical connectors (for example, a pair of LC optical connectors) and an optical transceiver for sending optical signals over one of the optical fibers 112 and for receiving optical signals from another of the optical fibers 112. In one implementation, each optical interface 120 and 122 is implemented using a small form-factor pluggable (SFP) modular optical transceiver that includes integrated optical LC connectors.

Each of the optical interfaces 120 and 122 also includes a respective physical layer device (PHY). In the exemplary embodiment shown in FIG. 1, where a CPRI interface is established over the front-haul communication link 112, the physical layer devices comprise CPRI physical layer devices.

The pair of optical fibers 112b that is connected to one of the plurality of RRHs 106 at one end and that normally would be connected to a corresponding BBU 104 at the other end is instead disconnected from the corresponding BBU 104 and connected to the corresponding RRH optical interface 122 of the optical signal power tester 100. One end of another pair of optical fibers 112a is connected to the corresponding BBU 104, where the other end of that second pair of optical fibers 112a is connected to the corresponding BBU optical interface 120. It is to be understood, however, that the optical signal power tester 100 can be coupled to the front-haul communication link 112 in other ways (for example, using passive optical couplers).

In the exemplary embodiment shown in FIG. 1, the optical signal power tester 100 further comprises one or more programmable processors 128 for executing software 130. The software 130 comprises program instructions that are stored (or otherwise embodied) on or in an appropriate non-transitory storage medium or media 132 (such as flash or other non-volatile memory, magnetic disc drives, and/or optical disc drives) from which at least a portion of the program instructions are read by the programmable processor 128 for execution thereby. Although the storage media 132 is shown in FIG. 1 as being included in, and local to, the optical signal power tester 100, it is to be understood that remote storage media (for example, storage media that is accessible over a network) and/or removable media can also be used. The optical signal power tester 100 also includes memory 134 for storing the program instructions (and any related data) during execution by the programmable processor 128. Memory 134 comprises, in one implementation, any suitable form of random access memory (RAM) now known or later developed, such as dynamic random access memory (DRAM). In other embodiments, other types of memory are used. Functionality described here as being implemented in software 130 can be implemented in other ways (for example, using an application specific integrated circuit (ASIC) or field programmable gate array (FPGA)).

The software 130 executing on the programmable processor 128 sends and receives frames of user plane and control plane information with the physical layer devices included in the optical interfaces 120 and 122. For example, the software 130 is configured to capture downlink frames in order to determine system information that the BBU 104 and the RRH 106 are using for communicating with each other and with the wireless units 108 over the wireless RF channel (for example, information identifying what RF frequency channels are being used to communicate over the RF frequency channel).

In this exemplary embodiment, the optical signal power tester 100 can be operated in a PIM test mode. In this mode, downlink CPRI frames are transmitted by the BBU 104 on the front-haul communication link 112a. The optical signals are received at the BBU optical interface 120, which converts the received optical signal to an electrical signal that is provided to the CPRI PHY included in the BBU optical interface 120. The CPRI PHY extracts the downlink CPRI frames from the received signals and communicates the downlink CPRI frames to the programmable processor 128 for processing by the software 130.

The uplink CPRI frames transmitted from the RRH 106 on the front-haul communication link 112b are captured by the optical signal power tester 100 and checked for PIM products. That is, uplink CPRI frames transmitted by the RRH 106 on the front-haul communication link 112b. The optical signals are received at the RRH optical interface 122, which converts the received optical signal to an electrical signal that is provided to the CPRI PHY included in the RRH optical interface 122. The CPRI PHY extracts the uplink CPRI frames from the received signals and communicates the uplink CPRI frames to the programmable processor 128 for processing by the software 130. The software 130 is configured to extract the uplink baseband IQ data from the AxCs included in the uplink CPRI frames and process that baseband IQ data in order to identify and characterize any PIM that may occur in the uplink in response to injecting the PIM test signals.

A user can interact with the software 130 executing on the optical signal power tester 100 using a user device 136, e.g., smartphone, tablet, or computer. The user device 136 is communicatively coupled to the optical signal power tester 100. In the exemplary embodiment shown in FIG. 1, the optical signal power tester 100 includes one or more wired interfaces 138 (for example, an ETHERNET interface and/or a USB interface) and wireless interfaces 140 (for example, a Wi-Fi wireless interface) to communicatively couple the optical signal power tester 100 to a local area network or directly to the user device 136. Moreover, a remotely located user device 136 can access the optical signal power tester 100 via a connection established over the local area network and/or a public network such as the Internet. In one embodiment, the software 130 implements a webserver that is operable to present a browser-based user interface that enables a user to use a general-purpose Internet browser installed on the user device 136 to interact with the software 130 on the optical signal power tester 100.

Although optical signal power tester 100 is described primarily as implementing a technique to test signal power of a PIM signal, the techniques described herein can be used with other similar systems and devices that intercept baseband IQ data that is communicated over a front-haul communication link between a BBU and RRH including, for example, optical spectrum analyzers, interference detectors and/or signal quality management systems. Moreover, one or more of these functions (for example, PIM testing, spectrum analyzer, interference detecting, and signal quality management) can be combined into a single unit.

Also, although the embodiments described above are described as using antenna carriers in downlink CPRI frames, it is to be understood that the techniques described herein can be used with other streams of baseband IQ data (for example, streams of baseband IQ data communicated over an OBSAI or ORI interface).

Figure 2:
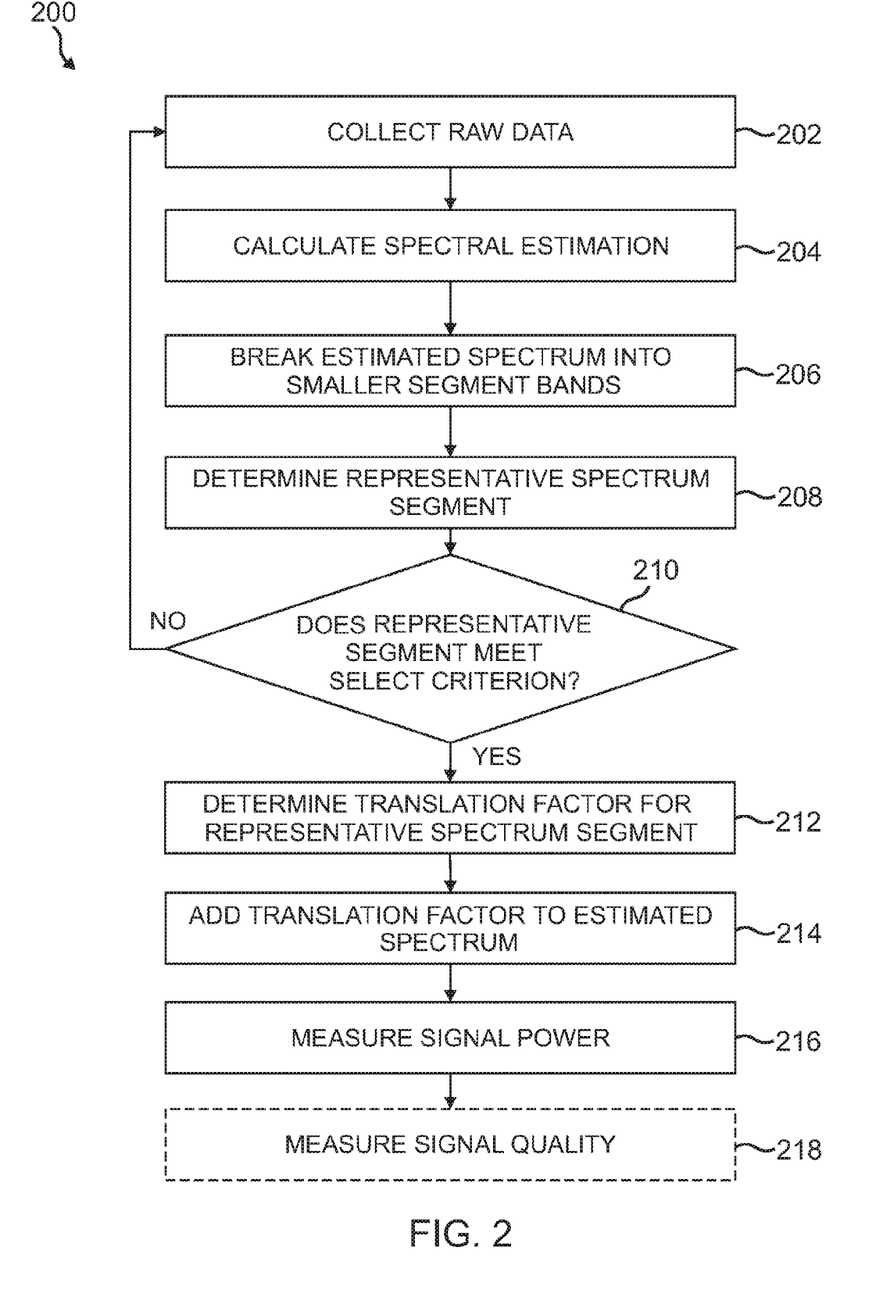
FIG. 2 is a flow diagram of one exemplary embodiment of a method for determining the signal power from a digital RF/IF interface.

FIG. 2 is a flow diagram illustrating an example method 200 of managing data communications according to one embodiment of the present disclosure. Particularly, in one embodiment, method 200 enables generating signal parameters to a reasonable accuracy without prior knowledge of the circuits or signals in the signal chain. The functions, structures, and other description of elements for such embodiments described herein may apply to like named elements of method 200 and vice versa. Further, in one embodiment, the method of FIG. 2 is implemented as program code that is stored in storage media 132 and executed by processor 128. As described in more detail below, the execution of the program code enables, in one embodiment, generation of measurements of power and/or quality with a reasonable degree of accuracy. While method 200 is described below with respect to the frequency domain, it should be understood that the method could also be implemented in the time domain.

The method begins with collecting raw data (block 202). In particular, this step comprises collecting digital IQ data or baseband IQ data. In exemplary embodiments, the digital IQ data or baseband IQ data is collected from a digital interface, such as, for example, a CPRI, OBSAI, or ORI interface.

The method proceeds with calculating the spectral estimation of the signal (block 204). In exemplary embodiments, the spectral estimation is calculated using the Welch method, which is also referred to as the Welch function. The result of the Welch method is a power spectral estimation or power density estimation. In exemplary embodiments, the overlap parameter of the Welch function is set to zero to remove bias in the estimate. The spectral estimate is performed over enough number of samples so that a reference level, e.g., the noise floor variance, is less than the required tolerance in the estimation. For example, the observation time may comprise 40 ms and the noise floor variance can be kept below 0.3 dB. The FFT bin spacing is chosen for efficient implementation and performance in estimating the spectrum. In exemplary embodiments, the FFT bin spacing is 1.875 kHz for a 10 MHz wideband signal. It should be understood that other observation time lengths, noise floor variance thresholds, and bin spacing can be selected depending on the desired performance of the system.

The method proceeds with dividing the estimated spectrum into smaller segment bands (block 206). In exemplary embodiments, the estimated spectrum is broken into contiguous frequency bins, which are identified in the passband of the received spectrum. The passband of the frequency spectrum is smaller than the sampling frequency used in the Welch function.

The method proceeds with determining a representative spectrum segment (block 208). In one embodiment, the representative spectrum segment is representative of the thermal noise (noise floor), which is to be used as the reference for determining a signal characteristic, e.g., the signal power or signal quality. In embodiments where a signal power tester is not aware of any characteristics of the signal, Applicants have determined that the thermal noise, which will be present when using a receiver, can be used as a reference to generate an absolute measure of a signal characteristic, e.g., power, quality, with reasonable accuracy. In embodiments where the signal power tester is aware of another reference signal or characteristic of the incoming signal, then the other reference signal or characteristic may be used.

In some embodiments, determining the representative spectrum segment includes selecting the contiguous frequency segment with lowest mean power. "Mean" and "average" are used interchangeably herein to refer to the arithmetic mean. This spectrum segment will be used as the reference for power calculation. In such embodiments, there may be issues that arise if the thermal noise signal tone is small. In other embodiments, determining a representative spectrum segment includes sorting the spectrum segments and selecting four segments with the lowest mean power. In exemplary embodiments, a different number of segments could be used. In such embodiments, the representative spectrum segment is selected based on characteristics such as, but not limited to, the difference between the mean power and the median power for each segment, and the variance of the estimated frequency domain FFT bin amplitude for each segment. In some embodiments, a test is conducted to determine what segments are considered for selection. In one embodiment, the mean power of the segment with the fourth lowest mean power is differenced with the mean power of the segment with the lowest mean power. If the difference is above a threshold, then the segment with the fourth lowest power is not considered for selection as the representative spectrum segment.

In alternative embodiments, instead of dividing the spectrum into smaller segment bands, such as that described with respect to block 206, the method proceeds with searching the band of contiguous minima by looking at the power difference in subsequent frequency bins around some local minima. In such embodiments, the representative spectrum segment is a contiguous frequency segment formed around a minima where the power difference will be the minimum.

The method proceeds with determining whether the representative spectrum segment meets selected criterion (block 210). For example, in one embodiment, the objective of the determination is to ensure that the representative spectrum segment represents thermal noise only. In exemplary embodiments, the selected criterion includes a variance threshold, a median-mean power threshold, a kurtosis threshold, or the like. In some embodiments, determining whether the representative spectrum segment meets select criterion includes using an Inverse FFT (IFFT) and analyzing whether the distribution of the signal is Gaussian. Since thermal noise is Gaussian, this analysis prevents using a segment that has the lowest mean power but does not actually represent the thermal noise.

When the representative spectrum segment does not meet the variance and/or statistical criterion, the method proceeds to block 202. In alternative implementations, if none of the segments meet the criterion, then the method proceeds with determining a translation factor for the segment that has the least power but confidence from that measurement will be less.

When the representative spectrum segment does meet the variance and/or statistical criterion, the method proceeds with determining a translation factor for the representative spectrum segment (block 212). In exemplary embodiments, if $P_i$ is the power of the $i^{th}$ frequency bin of L contiguous frequency bins in a segment whose mean power is lowest, compared to all other segments and meets the selected criterion, then the following relation will be established.

$$10*\log 10\left(\frac{1}{L}\sum_{i=1}^{L} P_i\right) + \Delta = -174 + 10\log 10\left(\frac{fs}{NFFT}\right) + N_f \quad (1)$$

$$\Delta = -174 + 10\log 10\left(\frac{fs}{NFFT}\right) + N_f - 10*\log 10\left(\frac{1}{L}\sum_{i=1}^{L} P_i\right) \quad (2)$$

The Noise figure of the front end of the receiver is NE In this equation, fs, is the sampling frequency and NFFT is the FFT size in Welch's method. The translation factor, denoted as $\Delta$, will be calculated from the equation above to establish the noise floor reference and interpret the absolute power in the spectrum. Also note that a coarse estimate of the noise figure of the receiver will be needed here to find the translation factor. In exemplary embodiments, for a signal power tester, the noise figure of an RRH is assumed to be approximately 2.5 dB.

In equations 1 and 2 included above, the value "−174" is included. In one example, this value is determined using the following equation: Noisefloor=10×log 10 (k×T×B), where k=Boltzman's constant, T=temperature in K, and B=signal bandwidth. Using exemplary values for one implementation, Noisefloor=10×log 10(1.38×(10−23×290°×1 Hz)=−203.9 dBW/Hz. Next, to convert from dBWatts to dBmilliwatts (dBm), this value is increased by 30 dB, so −203.9 dBW/Hz+30 dB=−173.9 dBm/Hz. It should be understood that other values could be used depending on the particular application.

The method proceeds with adding the translation factor for the representative spectrum segment to the estimated spectrum (block 214) and measuring the signal power (block 216). The absolute power of any received signal power can be obtained by adding the translation factor to the estimated spectrum. The measured signal power is with respect to the wideband signal. In exemplary embodiments, the signal power of a narrowband area of the spectrum where a tone is expected may also be calculated. In such embodiments, if S is the amplitude scaling factor in the digital receiver chain then the translation factor for the narrowband can be calculated with the following equation:

Narrowband Translation factor $\Delta_{Narrow}=\Delta+20*\log 10(S)$ (3)

In exemplary embodiments, the method 200 can be performed in parallel for multiple ports of the digital interface. In such embodiments, the (wideband) translation factor is calculated for each port. However, instead of the individually calculated translation factors being used for each of the ports, the individual translation factors will be compared and the smallest translation factor of the group will be used to calculate signal power of the noise floor. The comparison is performed because the noise floor should be a minimum.

The method optionally proceeds with measuring the signal quality (block 218). In exemplary embodiments, the quality of the signal can be calculated by measuring the signal power and dividing it by the noise power in the bandwidth equivalent to the signal bandwidth. The noise power in the equivalent bandwidth will be estimated from the vicinity of the desired signal.

EXAMPLE EMBODIMENTS

Example 1 includes a signal power tester unit, comprising: at least one interface to communicatively couple the signal power tester unit to a front-haul communication link used for communicating front-haul data to a remote radio head (RRH) having one or more antenna ports; a programmable processor, coupled to the interface, configured to execute software, wherein the software is operable to cause the signal power tester unit to do the following: determine a representative segment indicative of a noise floor of a communication signal; determine whether the representative segment meets selected criterion; determine a translation factor for the representative segment; and measure power of the communication signal based on applying the translation factor.

Example 2 includes the signal power tester unit of Example 1, wherein the software is further operable to cause the signal power tester unit to calculate a spectral estimation of the communication signal, wherein the representative segment comprises a representative spectrum segment.

Example 3 includes the signal power tester unit of Example 2, wherein the spectral estimation of the communication signal is calculated using the Welch function.

Example 4 includes the signal power tester unit of Example 3, wherein the overlap parameter of the Welch function is set to zero.

Example 5 includes the signal power tester unit of any of Examples 2-4, wherein the spectral estimation is divided into a plurality of contiguous frequency bins.

Example 6 includes the signal power tester unit of Example 5, wherein determine a representative segment indicative of a noise floor of a communication signal includes selecting a contiguous frequency bin with lowest mean power from the plurality of contiguous frequency bins.

Example 7 includes the signal power tester unit of any of Examples 5-6, wherein determine a representative segment indicative of a noise floor of a communication signal includes: selecting a subset of contiguous frequency bins with lowest mean power from the plurality of contiguous frequency bins; determining a first contiguous frequency bin of the subset of contiguous frequency bins has the lowest mean power of the subset of contiguous frequency bins; determining a difference between the mean power of the first contiguous frequency bin and the mean power of a second contiguous frequency bin of the subset of contiguous frequency bins; determining whether the difference is above a threshold; and when the difference is above the threshold, excluding the second contiguous frequency bin from consideration as the representative segment.

Example 8 includes the signal power tester unit of any of Examples 2-7, wherein determine a representative segment indicative of a noise floor of a communication signal includes: searching a band of contiguous minima by considering a power difference in frequency bins around a local minima; and selecting a contiguous frequency segment formed around a minima where the power difference is a minimum as the representative segment.

Example 9 includes the signal power tester unit of any of Examples 2-8, wherein determine whether the representative segment meets selected criterion includes: applying an Inverse Fast Fourier Transform (IFFT) to the representative segment to produce a distribution of the representative segment; and determining whether a distribution of the representative segment is Gaussian.

Example 10 includes the signal power tester unit of any of Examples 2-9, wherein measure power of the communication signal based on applying the translation factor includes adding the translation factor for the representative segment to the spectral estimation.

Example 11 includes the signal power tester of any of Examples 2-10, wherein the at least one interface comprises a plurality of interfaces, wherein the software is further operable to cause the signal power tester unit to: determine a representative segment indicative of a noise floor of a communication signal for each of the plurality of interfaces; determine whether each of the representative segments for each of the plurality of interfaces meet selected criterion; determine a respective translation factor for each of the representative segments for each of the plurality of interfaces; identify the respective translation factor with the smallest value; and measure power of the communication signal for each of the plurality of interfaces based on applying the respective translation factor with the smallest value.

Example 12 includes the signal power tester unit of any of Examples 1-11, wherein the translation factor is one of a wideband translation factor and a narrowband translation factor.

Example 13 includes the signal power tester unit of any of Examples 1-12, wherein the selected criterion includes at least one of: a variance threshold; a median-mean power threshold; or a kurtosis threshold.

Example 14 includes the signal power tester unit of any of Examples 1-13, wherein the software is further operable to cause the signal power tester to measure signal quality of the communication signal.

Example 15 includes the signal power tester unit of Example 14, wherein measure signal quality of the communication signal comprises dividing the measured power of the communication signal based on applying the translation factor by power of noise in a bandwidth equivalent to a bandwidth of the communication signal.

Example 16 includes the signal power tester unit of any of Examples 1-15, wherein the at least one interface comprises at least one of a CPRI interface, an OBSAI interface, or an ORI interface.

Example 17 includes the signal power tester unit of any of Examples 1-16, wherein the software is further operable to cause the signal power tester unit to inject a test signal in downlink digital IQ data on the front-haul communication link.

Example 18 includes the signal power tester unit of Example 17, wherein the communication signal is a passive intermodulation (PIM) signal in uplink digital IQ data on the front-haul communication link.

Example 19 includes a method of measuring signal power, comprising: receiving a first communication signal at a first digital interface; determining a first representative segment indicative of a noise floor of the first communication signal; determining whether the first representative segment meets selected criterion; determining a first translation factor for the first representative segment; and measuring power of the first communication signal based on applying the first translation factor.

Example 20 includes the method of Example 19, further comprising calculating a spectral estimation of the first communication signal, wherein the first representative segment comprises a representative spectrum segment.

Example 21 includes the method of Example 20, further comprising dividing the spectral estimation into a plurality of contiguous frequency bins.

Example 22 includes the method of Example 21, wherein determining a first representative segment indicative of a noise floor of the first communication signal includes selecting a contiguous frequency bin with lowest mean power from the plurality of contiguous frequency bins.

Example 23 includes the method of any of Examples 21-22, wherein determining a first representative segment indicative of a noise floor of the first communication signal includes: selecting a subset of contiguous frequency bins with lowest mean power from the plurality of contiguous frequency bins; determining a first contiguous frequency bin of the subset of contiguous frequency bins has the lowest mean power of the subset of contiguous frequency bins; determining a difference between the mean power of the first contiguous frequency bin and the mean power of a second contiguous frequency bin of the subset of contiguous frequency bins; determining whether the difference is above a threshold; and when the difference is above the threshold, excluding the second contiguous frequency bin from consideration as the first representative segment.

Example 24 includes the method of any of Examples 20-23, wherein determining a first representative segment indicative of a noise floor of the first communication signal includes: searching a band of contiguous minima by considering a power difference in frequency bins around a local minima; and selecting a contiguous frequency segment formed around a minima where the power difference is a minimum as the representative segment.

Example 25 includes the signal power tester unit of any of Examples 20-24, wherein determining whether the first representative segment meets selected criterion includes: applying an Inverse Fast Fourier Transform (IFFT) to the first representative segment to produce a distribution of the first representative segment; and determining whether a distribution of the first representative segment is Gaussian.

Example 26 includes the method of any of Examples 20-25, wherein measuring power of the first communication signal based on applying the first translation factor includes adding the first translation factor for the first representative segment to the spectral estimation.

Example 27 includes the method of any of Examples 20-26, further comprising: receiving a second communication signal at a second digital interface; determining a second representative segment indicative of a noise floor of the second communication signal; determining whether the second representative segment meets selected criterion; determining a translation factor for the second representative segment; identifying the smallest translation factor by comparing the first translation factor to the second translation factor; when the first translation factor is the smallest translation factor, measuring the power of the first communication signal and the second communication signal based on applying the first translation factor; and when the second translation factor is the smallest translation factor, measuring the power of the first communication signal and the second communication signal based on applying the second translation factor.

Example 28 includes the method of any of Examples 19-27, further comprising measuring signal quality of the first communication signal.

Example 29 includes the method of Example 28, wherein measuring signal quality of the first communication signal comprises dividing the measured power of the first communication signal based on applying the first translation factor by power of noise in a bandwidth equivalent to a bandwidth of the first communication signal.

Example 30 includes a program product for measuring signal power, tangibly stored on a non-transitory storage medium, comprising instructions operable to cause at least one programmable processor to: determine a representative segment indicative of a noise floor of a communication signal received at a digital interface; determine whether the representative segment meets selected criterion; determine a translation factor for the representative segment; and measure power of the communication signal based on applying the translation factor.

Example 31 includes the signal power tester unit of Example 30, wherein the instructions are further operable to cause the at least one programmable processor to calculate a spectral estimation of the communication signal, wherein the representative segment comprises a representative spectrum segment.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A signal power tester unit, comprising:
    at least one interface to communicatively couple the signal power tester unit to a front-haul communication link used for communicating front-haul data to a remote radio head (RRH) having one or more antenna ports;
    a programmable processor, coupled to the interface, configured to execute software, wherein the software is operable to cause the signal power tester unit to do the following:
    determine a representative segment indicative of a noise floor of a communication signal;
    determine whether the representative segment meets selected criterion;
    determine a translation factor for the representative segment; and
    measure power of the communication signal based on applying the translation factor.

2. The signal power tester unit of claim 1, wherein the software is further operable to cause the signal power tester unit to calculate a spectral estimation of the communication signal, wherein the representative segment comprises a representative spectrum segment.

3. The signal power tester unit of claim 2, wherein the spectral estimation of the communication signal is calculated using the Welch function.

4. The signal power tester unit of claim 3, wherein the overlap parameter of the Welch function is set to zero.

5. The signal power tester unit of claim 2, wherein the spectral estimation is divided into a plurality of contiguous frequency bins.

6. The signal power tester unit of claim 5, wherein determining a representative segment indicative of a noise floor of a communication signal includes selecting a contiguous frequency bin with lowest mean power from the plurality of contiguous frequency bins.

7. The signal power tester unit of claim 5, wherein determining a representative segment indicative of a noise floor of a communication signal includes:
    selecting a subset of contiguous frequency bins with lowest mean power from the plurality of contiguous frequency bins;
    determining a first contiguous frequency bin of the subset of contiguous frequency bins has the lowest mean power of the subset of contiguous frequency bins;
    determining a difference between the mean power of the first contiguous frequency bin and the mean power of a second contiguous frequency bin of the subset of contiguous frequency bins;
    determining whether the difference is above a threshold; and
    when the difference is above the threshold, excluding the second contiguous frequency bin from consideration as the representative segment.

8. The signal power tester unit of claim 2, wherein determining a representative segment indicative of a noise floor of a communication signal includes:
    searching a band of contiguous minima by considering a power difference in frequency bins around a local minima; and
    selecting a contiguous frequency segment formed around a minima where the power difference is a minimum as the representative segment.

9. The signal power tester unit of claim 2, wherein determining whether the representative segment meets selected criterion includes:
    applying an Inverse Fast Fourier Transform (IFFT) to the representative segment to produce a distribution of the representative segment; and
    determining whether the distribution of the representative segment is Gaussian.

10. The signal power tester unit of claim 2, wherein measure power of the communication signal based on applying the translation factor includes adding the translation factor for the representative segment to the spectral estimation.

11. The signal power tester unit of claim 2, wherein the at least one interface comprises a plurality of interfaces, wherein the software is further operable to cause the signal power tester unit to:
    determine a representative segment indicative of a noise floor of a communication signal for each of the plurality of interfaces;

determine whether each of the representative segments for each of the plurality of interfaces meet selected criterion;
determine a respective translation factor for each of the representative segments for each of the plurality of interfaces;
identify the respective translation factor with a smallest value; and
measure power of the communication signal for each of the plurality of interfaces based on applying the respective translation factor with the smallest value.

12. The signal power tester unit of claim 1, wherein the translation factor is one of a wideband translation factor and a narrowband translation factor.

13. The signal power tester unit of claim 1, wherein the selected criterion includes at least one of:
a variance threshold;
a median-mean power threshold; or
a kurtosis threshold.

14. The signal power tester unit of claim 1, wherein the software is further operable to cause the signal power tester unit to measure signal quality of the communication signal.

15. The signal power tester unit of claim 14, wherein measure signal quality of the communication signal comprises dividing the measured power of the communication signal based on applying the translation factor by power of noise in a bandwidth equivalent to a bandwidth of the communication signal.

16. The signal power tester unit of claim 1, wherein the at least one interface comprises at least one of a Common Public Radio Interface (CPRI) interface, an Open Base Station Architecture Initiative (OBSAI) interface, or an Open Radio Interface (ORI) interface.

17. The signal power tester unit of claim 1, wherein the software is further operable to cause the signal power tester unit to inject a test signal in downlink digital IQ data on the front-haul communication link.

18. The signal power tester unit of claim 17, wherein the communication signal is a passive intermodulation (PIM) signal in uplink digital IQ data on the front-haul communication link.

19. A method of measuring signal power, comprising:
receiving a first communication signal at a first digital interface;
determining a first representative segment indicative of a noise floor of the first communication signal;
determining whether the first representative segment meets selected criterion;
determining a first translation factor for the first representative segment; and
measuring power of the first communication signal based on applying the first translation factor.

20. The method of claim 19, further comprising calculating a spectral estimation of the first communication signal, wherein the first representative segment comprises a representative spectrum segment.

21. The method of claim 20, further comprising dividing the spectral estimation into a plurality of contiguous frequency bins.

22. The method of claim 21, wherein determining a first representative segment indicative of a noise floor of the first communication signal includes selecting a contiguous frequency bin with lowest mean power from the plurality of contiguous frequency bins.

23. The method of claim 21, wherein determining a first representative segment indicative of a noise floor of the first communication signal includes:

selecting a subset of contiguous frequency bins with lowest mean power from the plurality of contiguous frequency bins;
determining a first contiguous frequency bin of the subset of contiguous frequency bins has the lowest mean power of the subset of contiguous frequency bins;
determining a difference between the mean power of the first contiguous frequency bin and the mean power of a second contiguous frequency bin of the subset of contiguous frequency bins;
determining whether the difference is above a threshold; and
when the difference is above the threshold, excluding the second contiguous frequency bin from consideration as the first representative segment.

24. The method of claim 20, wherein determining a first representative segment indicative of a noise floor of the first communication signal includes:
searching a band of contiguous minima by considering a power difference in frequency bins around a local minima; and
selecting a contiguous frequency segment formed around a minima where the power difference is a minimum as the representative segment.

25. The method of claim 20, wherein determining whether the first representative segment meets selected criterion includes:
applying an Inverse Fast Fourier Transform (IFFT) to the first representative segment to produce a distribution of the first representative segment; and
determining whether the distribution of the first representative segment is Gaussian.

26. The method of claim 20, wherein measuring power of the first communication signal based on applying the first translation factor includes adding the first translation factor for the first representative segment to the spectral estimation.

27. The method of claim 20, further comprising:
receiving a second communication signal at a second digital interface;
determining a second representative segment indicative of a noise floor of the second communication signal;
determining whether the second representative segment meets selected criterion;
determining a translation factor for the second representative segment;
identifying a smallest translation factor by comparing the first translation factor to the second translation factor;
when the first translation factor is the smallest translation factor, measuring the power of the first communication signal and the second communication signal based on applying the first translation factor; and
when the second translation factor is the smallest translation factor, measuring the power of the first communication signal and the second communication signal based on applying the second translation factor.

28. The method of claim 19, further comprising measuring signal quality of the first communication signal.

29. The method of claim 28, wherein measuring signal quality of the first communication signal comprises dividing the measured power of the first communication signal based on applying the first translation factor by power of noise in a bandwidth equivalent to a bandwidth of the first communication signal.

30. A program product for measuring signal power, tangibly stored on a non-transitory storage medium, comprising instructions operable to cause at least one programmable processor to:
  determine a representative segment indicative of a noise floor of a communication signal received at a digital interface;
  determine whether the representative segment meets selected criterion;
  determine a translation factor for the representative segment; and
  measure power of the communication signal based on applying the translation factor.

31. The program product of claim 30, wherein the instructions are further operable to cause the at least one programmable processor to calculate a spectral estimation of the communication signal, wherein the representative segment comprises a representative spectrum segment.

* * * * *